(12) United States Patent
Takeuchi et al.

(10) Patent No.: US 6,619,422 B2
(45) Date of Patent: Sep. 16, 2003

(54) STEERING UNIT AND INTERNAL DRAG CALCULATION APPARATUS USED THEREIN

(75) Inventors: Shinji Takeuchi, Aichi-ken (JP); Toshihiro Takahashi, Aichi-ken (JP); Minekazu Momiyama, Aichi-ken (JP); Eiichi Ono, Aichi-ken (JP); Shoji Asai, Aichi-ken (JP); Hiroshi Kuroyanagi, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/000,133

(22) Filed: Dec. 4, 2001

(65) Prior Publication Data

US 2002/0121402 A1 Sep. 5, 2002

(30) Foreign Application Priority Data

Dec. 5, 2000 (JP) .................... 2000-370704

(51) Int. Cl.$^7$ ............................. B62D 5/04
(52) U.S. Cl. .................. 180/446; 180/421; 701/41
(58) Field of Search ................. 180/443, 444, 180/446, 421, 422; 701/41, 42

(56) References Cited

U.S. PATENT DOCUMENTS

| | | | | |
|---|---|---|---|---|
| 5,151,860 A | * | 9/1992 | Taniguchi et al. | 701/41 |
| 5,198,981 A | * | 3/1993 | Collier-Hallman et al. | 701/42 |
| 5,428,537 A | * | 6/1995 | Kamono et al. | 701/41 |
| 5,631,833 A | * | 5/1997 | Wada et al. | 701/42 |
| 5,762,159 A | * | 6/1998 | Matsuoka et al. | 180/422 |
| 5,904,223 A | * | 5/1999 | Shimizu et al. | 180/443 |
| 5,996,724 A | * | 12/1999 | Shimizu et al. | 180/446 |
| 6,148,949 A | * | 11/2000 | Kobayashi et al. | 180/446 |
| 6,161,069 A | | 12/2000 | Fujita | 701/41 |
| 6,240,350 B1 | * | 5/2001 | Endo | 701/41 |
| 6,272,410 B2 | * | 8/2001 | Okanoue et al. | 701/42 |
| 6,470,994 B1 | * | 10/2002 | Shimizu et al. | 180/446 |

FOREIGN PATENT DOCUMENTS

JP   2000-62634   2/2000

* cited by examiner

*Primary Examiner*—Lesley D. Morris
*Assistant Examiner*—L. Lum
(74) *Attorney, Agent, or Firm*—Oblon, Spivak, McClelland, Maier & Neustadt, P.C.

(57) ABSTRACT

A power steering apparatus is provided to generate an assistant force corresponding to a change of viscous friction in the steering unit or the like, without losing information on reaction force from a road surface. An external force calculation portion calculates an external force, that is, a force other than a force for steering (i.e. a steering force) among forces (action forces) acting on the steering unit of a vehicle. The external force is assumed to be composed of an outside force received from the road surface, such as an SAT (self-aligning torque), and an internal drag resulting from a viscous friction generated in the steering unit, and the like and these two forces are separated in an outside force and internal drag calculation portion. In separating these two forces, under the assumption that the outside force is a function of a side slip angle and an internal drag is a function of a steering angular velocity, and coefficients of functions are obtained. On the basis of the thus calculated internal drag, a motor control portion controls a motor so as to generate an adequate assistant force.

5 Claims, 4 Drawing Sheets

STEERING UNIT AND INTERNAL DRAG CALCULATION APPARATUS USED THEREIN

INCORPORATION BY REFERENCE

The present application claims priority under 35 U.S.C. §119 to Japanese Patent Application No. 2000-370704, filed on Dec. 5, 2000. The contents of that application are incorporated herein by reference in its entirety.

BACKGROUND OF THE INVENTION

1. Field of the Invention

The present invention relates to a steering unit of a vehicle, and more particularly to a control of the steering unit.

2. Description of Related Art

In many vehicles wheels are provided, and steering is performed by changing directions of some of the wheels that are provided therein. Moreover, in steering, a power-steering unit which generates a force for assisting a force from a driver is also known.

Japanese Patent Publication No. 2000-62634 discloses an art related to a power steering unit, for always realizing constant steering reaction force characteristics by generating a target steering force with respect to a steering angle, and controlling an actual steering force so that it responds to the target steering force. Moreover, Japanese Patent Publication No. 2000-142434 discloses an art related to a power-steering unit, which performs control adapted to an increase in viscosity resulting from a drop in an oil temperature, by estimating an oil temperature in the steering unit and performing a control based on the thus estimated oil temperature.

Information on a reaction force against a steering operation performed by a driver is essential for the driver to know a road surface condition or the like. However; in the steering unit disclosed in the first of the above-mentioned patent applications, a control is performed such that the steering reaction force characteristics become constant without a reaction force from the road surface being incorporated. This causes a problem that it is difficult to convey information on the road surface condition of to the driver. Further, in the steering unit disclosed in the second of the above-mentioned patent applications, though it is possible to estimate a change in viscosity by temperature, it is not possible to respond to a change in the steering reaction force based on a secular change or a variation among individual steering units or the like.

SUMMARY OF THE INVENTION

It is therefore a first object of the present invention to calculate a drag generated in the steering unit which acts against the steering operation among forces acting on the steering unit. It is a second object of the present invention to provide a power-steering unit which generates adequate assistant force for the drag.

A steering unit of a vehicle is acted on by a force accompanying a steering operation of a driver, an assistant force for assisting the steering operation, a force input from outside of the vehicle, such as a road surface, to wheels subject to steering, and a force generated by a friction generated in the steering operation. If the above-mentioned forces acting on the steering unit and a force required for steering are obtained, an external force that is acting on the steering unit for other purposes can be obtained. The external force includes the above-mentioned outside force input from the outside of the vehicle and the above-mentioned internal drag generated in the steering unit The internal drag can be obtained by separating these two forces.

Further, the present invention can provide a steering unit that controls the assistant force based on the internal drag, and conveys, without loss, the information input from the road surface to the driver.

When separating the external force into the outside force and the internal drag, the external force and the outside force can be calculated by setting functions for defining them, and obtaining coefficients and constants of these functions. The function of the outside force is a function of a predetermined physical quantity indicating an amount of the steering operation, and the function of the internal drag is a function of a predetermined physical quantity indicating the speed of the steering operation. The above-mentioned functions can be defined by repeatedly detecting and calculating the external force and these predetermined physical quantities. Thus, the external force and the internal drag at present can be calculated from these functions.

Force acting on the steering unit can be calculated by storing the characteristics on motion of the steering unit beforehand, detecting predetermined physical quantities indicating the motion state of the steering unit, and applying them to the characteristics that were stored beforehand Characteristics related to the motion of the steering unit are expressed, for example, by an equation of motion related to a movable portion of the steering unit. Thus, the above-mentioned force acting at present can be obtained by repeatedly applying force acting on the steering unit, the operation amount, and the operation speed.

Further, the outside force can be calculated by storing the characteristics on motion of the vehicle beforehand, detecting predetermined physical quantities indicating the motion state of vehicle, and applying them to the characteristics that are stored as mentioned above. Characteristics related to motion of the vehicle are expressed by an equation of motion of the vehicle, for example. Thus, the outside force at present, the force input to the steering unit from the outside of the vehicle can be obtained, by repeatedly applying a force acting on the vehicle, a speed in a plane which intersects perpendicularly with the yaw axis of the vehicle, and the rotational speed around the yaw axis.

DETAILED DESCRIPTION OF PREFERRED EMBODIMENTS

Figure 1:
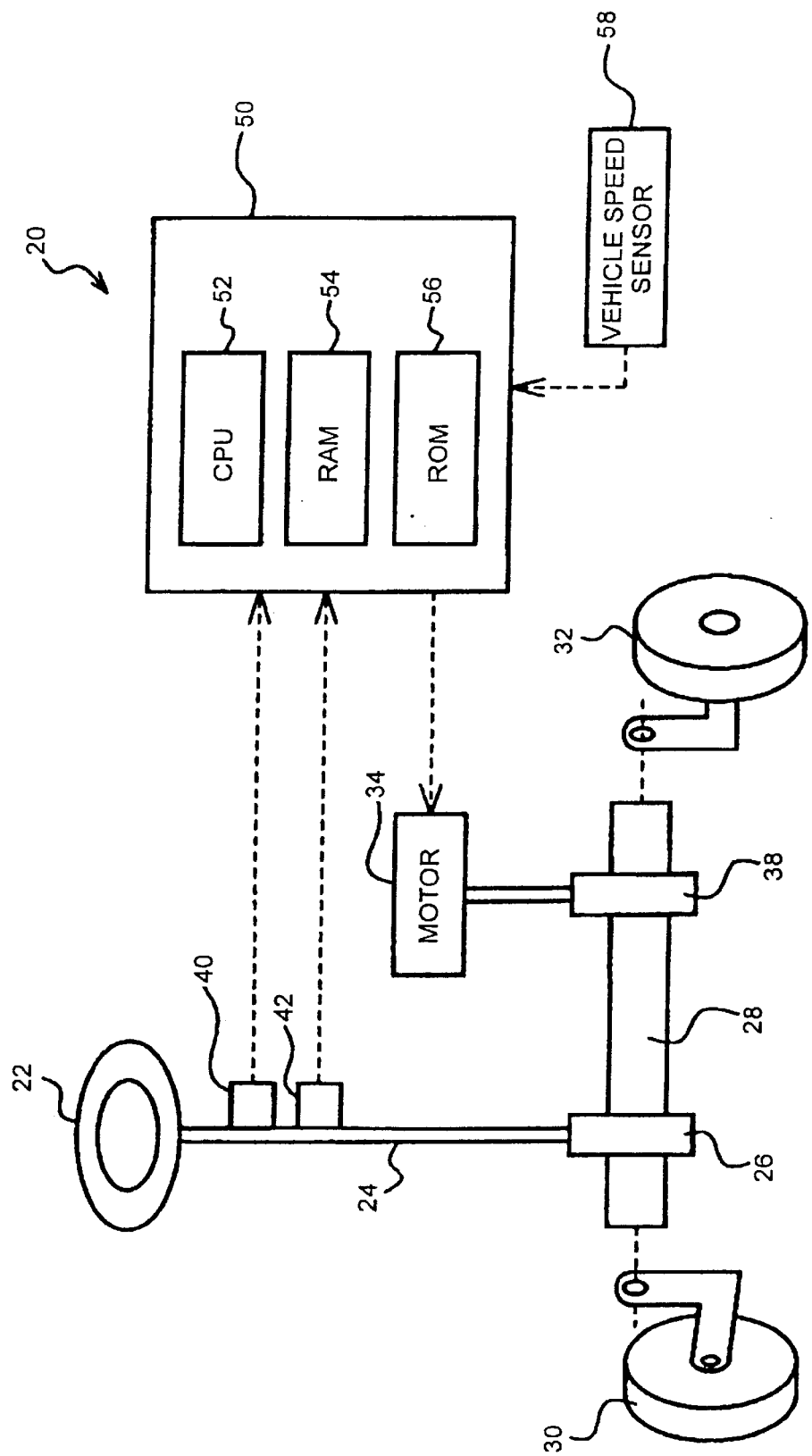
FIG. 1 is a schematic structural view of a steering unit according to an embodiment of the present invention.

Hereafter, referring to drawings, an embodiment of the present invention will be explained. FIG. 1 is a schematic structural view of a steering unit 20 according to an embodiment of the present invention. The Steering unit 20 is a power-steering unit which has a rack and pinion mechanism. A steering wheel 22 operated by a driver for turning a vehicle or the like is coupled to a pinion 26 of the rack and pinion mechanism via a steering shaft 24. The pinion 26 is meshed with a rack provided on a rack rod 28, where rotational motion of the steering wheel 22 is converted into a linear motion of the rack rod 28. The motion of the rack rod 28 is transmitted to a knuckle via a tie rod, and thus a direction of the steered wheels 30, 32, that is, the actual steering angle is changed. Furthermore, a motor 34 is provided in order to assist a steering operation of the driver, and the output from the motor 34 is transmitted to a nut 38 of a ball screw. The nut 38 is engaged with a ball screw provided on the rack rod 28, where a rotation of the motor 34 is converted into a linear motion.

On the steering shaft 24, are provided the torque sensor 40 which detects a torque applied to the shaft, and a steering angle sensor 42 which detects a steering angle, that is, a rotation angle of the shaft. Outputs from these sensors are fed to a control portion 50. Although the rotation angle of the steering shaft is measured directly in this embodiment, it may also be estimated from the rotation angle of the motor. In this case, the rotation angle of the steering shaft may be calculated with only a gear-ratio, ignoring torsional rigidity of the shaft, or it may be corrected with the torsional rigidity taken into consideration.

The control portion 50, which is a microprocessor primarily constituted by a CPU (central processing unit) 52, is provided with a ROM (read only memory) 54 storing processing programs, a RAM (random access memory) 56 storing data temporarily, and an I/O port, not shown. The control portion 50 receives a torque signal from the torque sensor 40, a steering angle signal from the steering angle sensor 42, and a vehicle speed signal from the vehicle speed sensor 58 installed on the vehicle body.

The control portion 50 sends out a drive signal to the motor 34 so that a predetermined assistant force is generated in accordance with the above-mentioned input signals. Thus, an assistant force for the steering force matched to a state of the vehicle including a state of the steering unit is generated.

Figure 2:
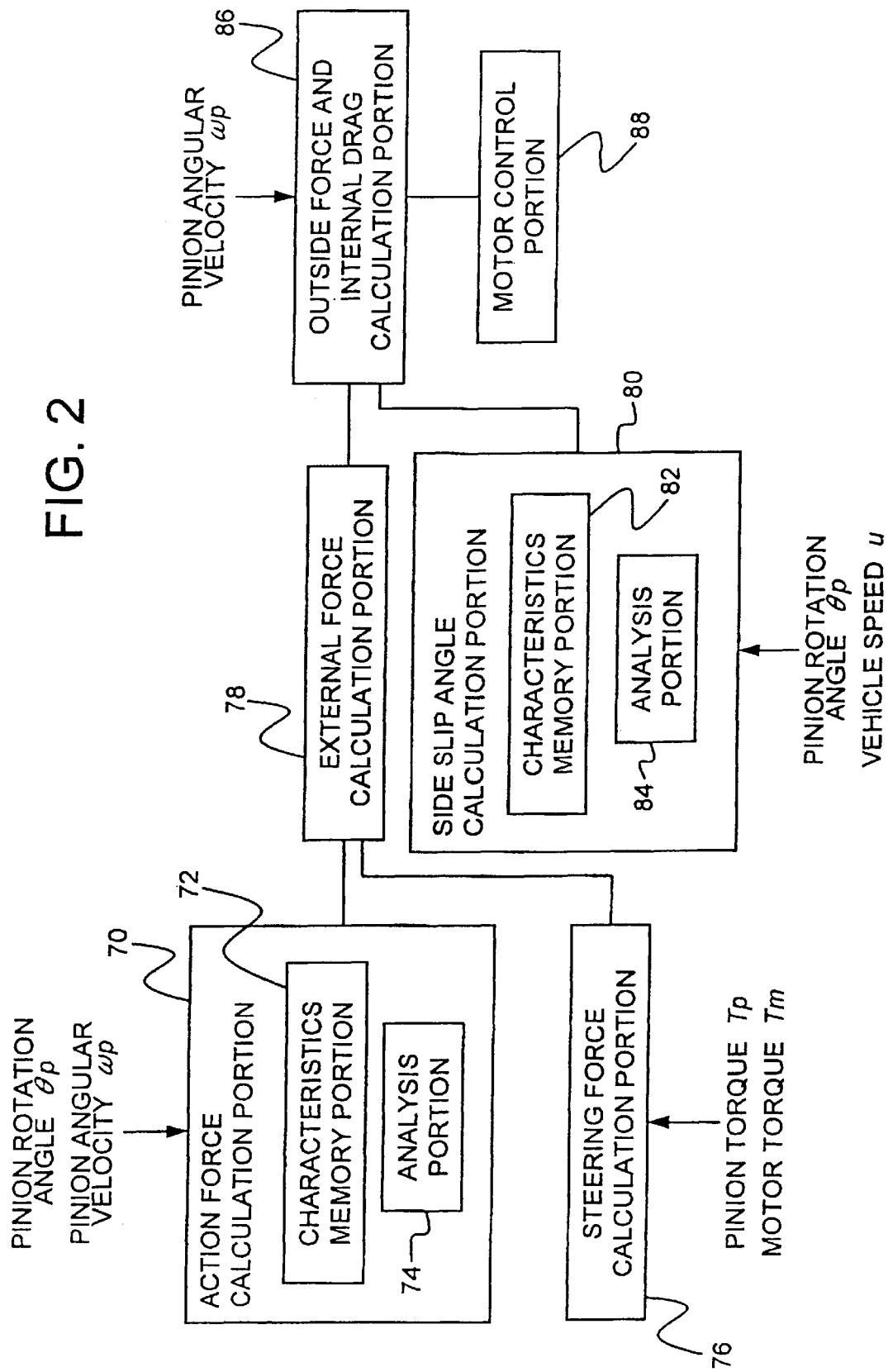
FIG. 2 is a block diagram related to a computation processing according to the embodiment of the present invention.

FIG. 2 is a block diagram showing a control in a case where the control portion 50 functions as a unit for calculating an internal drag generated in the steering unit 20, and also as a unit for controlling a motor 34 based on the internal drag. An action force calculation portion 70 calculates a force d that acts on the steering unit, from an equation of motion of the steering unit 20. Characteristics regarding motion of the steering unit 20 are stored in the characteristics memory portion 72 as a disturbance observer obtained by the equation of motion, as described later. In accordance with these characteristics, an analysis portion 74 analyses a current state of motion based on physical quantities indicating a state of motion, such as a pinion rotation angle $\theta_p$, and a pinion angular velocity $\omega_p$. Specifically, the characteristics memory portion 72 and the analysis portion 74 are the ROM 54 and the CPU 52, respectively, as shown in FIG. 1. Meanwhile, a steering force calculation portion 76 calculates a steering force $(T_p+\gamma \cdot T_m)$ acting on the steering unit 20 for steering; where $\gamma$ represents a ratio of a lead $g_p$ of the pinion 26 and a lead $g_b$ of the ball screw ($\gamma=g_p/g_b$). In addition, $T_p$ represents a pinion torque measured by the torque sensor 40, and $T_m$ represents a motor assist torque.

An external force calculation portion 78 calculates a force found by deducting the steering force $(T_p+\gamma \cdot T_m)$ from the action force d, that is, a force $T_d$ acting on the steering unit 20 for purposes other than the steering (hereafter referred to as an external force). Meanwhile, a side slip angle calculation portion 80 calculates a side slip angle $\alpha_f$ from the equation of motion of the vehicle. The characteristics regarding motion of the vehicle are stored in a characteristics memory portion 82 as an equation of the state found from the equation of motion. According to the thus stored characteristics, an analysis portion 84 analyses a current state of motion based on physical quantities indicating the state of motion of the vehicle, such as a vehicle speed u of the vehicle, and the pinion rotation angle $\theta_p$. The side slip angle $\alpha_f$ is included in this state, and is defined as an angle created by the center plane of the wheel when looking down at it from above, and the direction of travel of the wheel.

The above-mentioned external force $T_d$ is composed of a force input from outside of the vehicle, that is, from wheels 30, 32, (hereafter referred to as outside force) and a force generated in the steering unit 20 such as viscous resistance (hereafter referred to as internal drag). The outside force is a function of the side slip angle $\alpha_f$, and the internal drag is a function of the pinion angular velocity $\omega_p$. An outside force and internal drag calculation portion 86 calculates the outside force and the internal drag by obtaining coefficients and constants of these functions. Based on the thus calculated internal drag, a motor control portion 88 controls the motor 34. Since the motor is controlled based on the internal drag, the outside force, that is, an input from the wheels 30, 32 is transmitted to the driver as operational reaction force. The thus transmitted reaction force allows the driver to understand a cornering force of the steered wheels and incorporate it into to the steering operation.

Next, a specific computation in each calculation portion will be explained. An equation of motion of the steering unit 20 is described by Expression (1). This expression is represented in a form including a self-aligning torque (hereafter referred to as SAT) input from the road surface to the wheels, a Coulomb friction of the motor, a viscous friction in the steering unit, and the like.

$$\left(\left(\frac{g_p}{2\pi}\right)^2 M_r + \left(\frac{g_p}{g_b}\right)^2 J_m\right)\omega_p = T_d + T_p + \frac{g_p}{g_b}T_m \qquad (1)$$

$\theta_p$: Pinion rotation angle $M_r$: Rack shaft mass $g_p$: Lead of the pinion gear $T_d$: External force $T_m$: Motor assist torque $\omega_p$: Pinion rotational speed $J_m$: Motor inertia $g_b$: Lead of the ball screw $T_p$: Pinion torque If the right side of Expression (1) is considered as a disturbance in the disturbance observer, a disturbance observer as shown in Expression (2) can be constituted. All of the inertia $J_e$ and action force d in the expression (2) are defined by Expressions (3), (4). G represents an observer gain, and a suffix h represents an estimated amount of each state. (Same hereinafter.)

$$\frac{d}{dt}\begin{bmatrix}\omega_{ph}\\ \theta_{ph}\\ d_h\end{bmatrix}=\left(\begin{bmatrix}0 & 0 & \frac{1}{Je}\\ 1 & 0 & 0\\ 0 & 0 & 0\end{bmatrix}-G\begin{bmatrix}1 & 0 & 0\\ 0 & 1 & 0\end{bmatrix}\right)\begin{bmatrix}\omega_{ph}\\ \theta_{ph}\\ d_h\end{bmatrix}+G\begin{bmatrix}\omega_p\\ \theta_p\end{bmatrix} \quad (2)$$

where $$J_e = \left(\frac{g_p}{2\pi}\right)^2 M_r + \left(\frac{g_p}{g_b}\right)^2 T_m \quad (3)$$

$$d = T_d + T_p + \frac{g_p}{g_b}T_m \quad (4)$$

When these expressions are made discrete by determining the observer gain G by a pole arrangement method and setting a sampling time as 10 ms, the following Expressions (5), (6) are obtained. Each coefficient matrix is determined based on fixed values of the system, such as the rack shaft mass $M_r$, the motor inertia $J_m$, and the leads $g_p$, $g_b$ of the pinion gear and ball screw, respectively, and the like.

$$x(K+1) = \begin{bmatrix}0.3600 & 0.0989 & -0.0010\\ -0.5363 & -0.8208 & -0.0023\\ 0.0000 & 0.0000 & 0.0019\end{bmatrix} \quad (5)$$

$$x(k)+\begin{bmatrix}1.1797 & 0.0020\\ 0.1611 & -0.0010\\ 0.0012 & -0.5658\end{bmatrix}\begin{bmatrix}\omega_p(K)\\ \theta_p(K)\end{bmatrix}$$

$$\begin{bmatrix}\omega_{ph}(K)\\ \theta_{ph}(K)\\ d_h(K)\end{bmatrix}=\begin{bmatrix}0.4406 & -0.0110 & 0.0016\\ 0.0064 & -0.0029 & -0.5657\\ 0.8832 & 0.6890 & 0.0019\end{bmatrix} \quad (6)$$

$$x(k)+\begin{bmatrix}0.3677 & 0.0000\\ 0.0040 & 0.2001\\ 0.9766 & 0.0000\end{bmatrix}\begin{bmatrix}\omega_p(K)\\ \theta_p(K)\end{bmatrix}$$

Furthermore, using Expression (4), an estimated value $T_{dh}$ of the external force $T_d$ is obtained by the following Expression (7).

$$T_{ph}(k) = d_h(k) - T_p(k) - \frac{g_p}{g_b}T_m(k) \quad (7)$$

The motion characteristics of the vehicle are represented by an equation of state shown by the following Expressions (8), (9).

$$\frac{d}{dt}\begin{bmatrix}v\\ r\end{bmatrix}=\left(\begin{bmatrix}0 & -1\\ 0 & 0\end{bmatrix}u+\begin{bmatrix}-\frac{c_f+c_r}{M} & -\frac{L_f c_f - L_r c_r}{M}\\ -\frac{L_f c_f - L_r c_r}{I_z} & \frac{L_f^2 c_f - L_r^2 c_r}{I_z}\end{bmatrix}\Big/u\right)\begin{bmatrix}v\\ r\end{bmatrix}+\begin{bmatrix}\frac{c_f}{Mg_h}\\ \frac{L_f c_f}{I_z g_h}\end{bmatrix}\theta_p \quad (8)$$

$$\alpha_{fh} = (1-L_f)\Big/u\begin{bmatrix}v\\ r\end{bmatrix}-\begin{bmatrix}\theta_p\\ g_s\end{bmatrix} \quad (9)$$

v: Lateral velocity (m/s)
αf: Front wheel side slip angle (rad)
$C_f$, $C_r$: Cornering stiffness of front and rear wheels (N/rad)
Lf, $c_r$: Distance between the center of gravity of front and rear axles
$M_z$: Vehicle mass (kg)
$I_z$: Yaw inertia (kgm)
r: Yaw rate (rad/s)
u: Vehicle speed (m/s)
gs: Gear ratio between actual steerings In Expression (8), the lateral velocity v and the yaw rate r are output by setting the input as the vehicle speed u and the pinion rotation angle $\theta_p$. The side slip angle $\alpha_f$ can be estimated from the lateral velocity u and the yaw rate r. When these two expressions are made discrete by setting a sampling time as 10 ms, and expressed as a function of the vehicle speed, the following Expressions (10) and (11) are obtained. Each coefficient matrix is determined based on fixed values of the system. Moreover, it is possible to prolong the sampling time until the time corresponding to a steering frequency of the driver, and it is preferable that it fall within a range between 10 ms and 10 ms.

$$x(k+1)=\left(\begin{bmatrix}1 & 0\\ 0 & 1\end{bmatrix}+\begin{bmatrix}0 & -0.01\\ 0 & 0\end{bmatrix}u(k)+\begin{bmatrix}-0.4461 & 0.1017\\ 0.0524 & -0.4535\end{bmatrix}\Big/u(k)\right) \quad (10)$$

$$x(k)+\begin{bmatrix}0.0111v\\ 0.0079\end{bmatrix}\theta_p(k)$$

$$\alpha(k)=[0.4138 - 0.5673]\times(k)/u(k) - 0.0581\cdot\theta_p(k) \quad (11)$$

Assume that the external force $T_d$ estimated by the above-mentioned disturbance observer is composed of a component related to a viscosity proportional to the angular velocity of the motor, and a component of SAT proportional to the side slip angle, as shown in Expression (12). In Expression (12), a coefficient of viscosity dm of the component related to viscosity is expressed as a ratio of the torque converted from the motor shaft to the steering angular velocity. In addition, a coefficient k is a gradient with respect to the side slip angle of SAT, hereafter referred to a SAT gradient.

$$T_d = k\alpha_f - \frac{g_p}{g_b}d_{m\omega p} \quad (12)$$

k: Gradient with respect to the side slip angle of SAT
$d_m$: Coefficient of viscosity Here, by applying an on-line least-squares method to Expression (12), the SAT gradient and the coefficient of viscosity are identified. The viscosity of the motor, which changes depending on temperature, is a parameter with a smaller rate of change as compared with the SAT gradient. For this reason, a technique for estimating parameters with different rates of change is applied. The on-line least-squares method is calculated by the algorithm shown in the following Expressions (13) to (15).

$$K[k] = \frac{P[k] \cdot \phi[k]}{1 + \phi[k]^T \cdot P[k] \cdot \phi[k]} \quad (13)$$

$$\theta[k+1] = \theta[k] + K[k] \cdot (y[k] - \phi[k]^T \cdot \theta[k]) \quad (14)$$

$$P[k+1] = L \cdot \left[ P[k] - \frac{P[k] \cdot \phi[k] \cdot \phi[k]^T \cdot P[k]}{1 + \phi[k]^T \cdot P[k] \cdot \phi[k]} \right] \quad (15)$$

where $$y[k] = T_{dh}[k] \quad (16)$$

$$\phi[k] = \begin{bmatrix} -\frac{g_p}{g_b} \theta_p \\ \alpha_{fh} \end{bmatrix} \quad (17)$$

$$L = \begin{bmatrix} \lambda_1^{-\frac{1}{2}} & 0 \\ 0 & \lambda_2^{-\frac{1}{2}} \end{bmatrix} \quad (18)$$

Further, $\lambda_1$ and $\lambda_2$ are forgetting coefficients corresponding to the coefficient of viscosity and the SAT gradient respectively. In these expressions, $\lambda_1$ is set at 0.999 and $\lambda_2$ is at 0.95 such that the forgetting coefficient related to the coefficient of viscosity with a smaller rate of change becomes larger, and the forgetting coefficient related to the SAT gradient with a larger rate of change becomes smaller. Setting a forgetting coefficient for each parameter in this way enables an estimation which responds to an actual change for the SAT gradient with a larger rate of change. Moreover, parameters identified by this algorithm are used to create the following expression (19).

$$\theta[k] = \begin{bmatrix} d_{mh} \\ k_h \end{bmatrix} \quad (19)$$

If the coefficient of viscosity $d_m$ is obtained, a force resulting from the viscosity $\omega_p$ that indicates a steering angular velocity can be obtained. It becomes possible to perform assistance corresponding to a change in viscosity by responding to the force by determining an assistant force, that is, an assistant torque generated in the motor 34. Moreover, since the assistant force for the force resulting from SAT does not change, the steering reaction force incorporating the road surface condition can be reliably conveyed to the driver.

Figure 3:
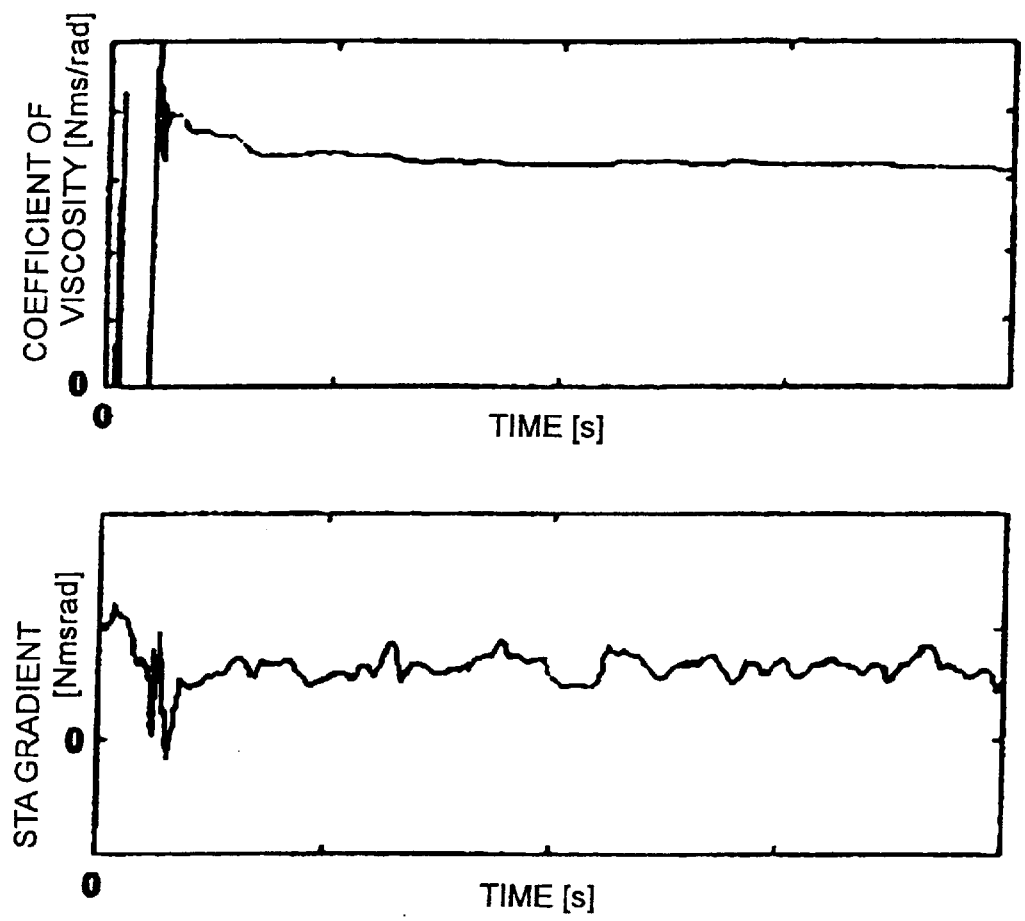
FIG. 3 are graphs showing a result when the embodiment of the present invention is applied, especially a result in the case of a low temperature.
Figure 4:
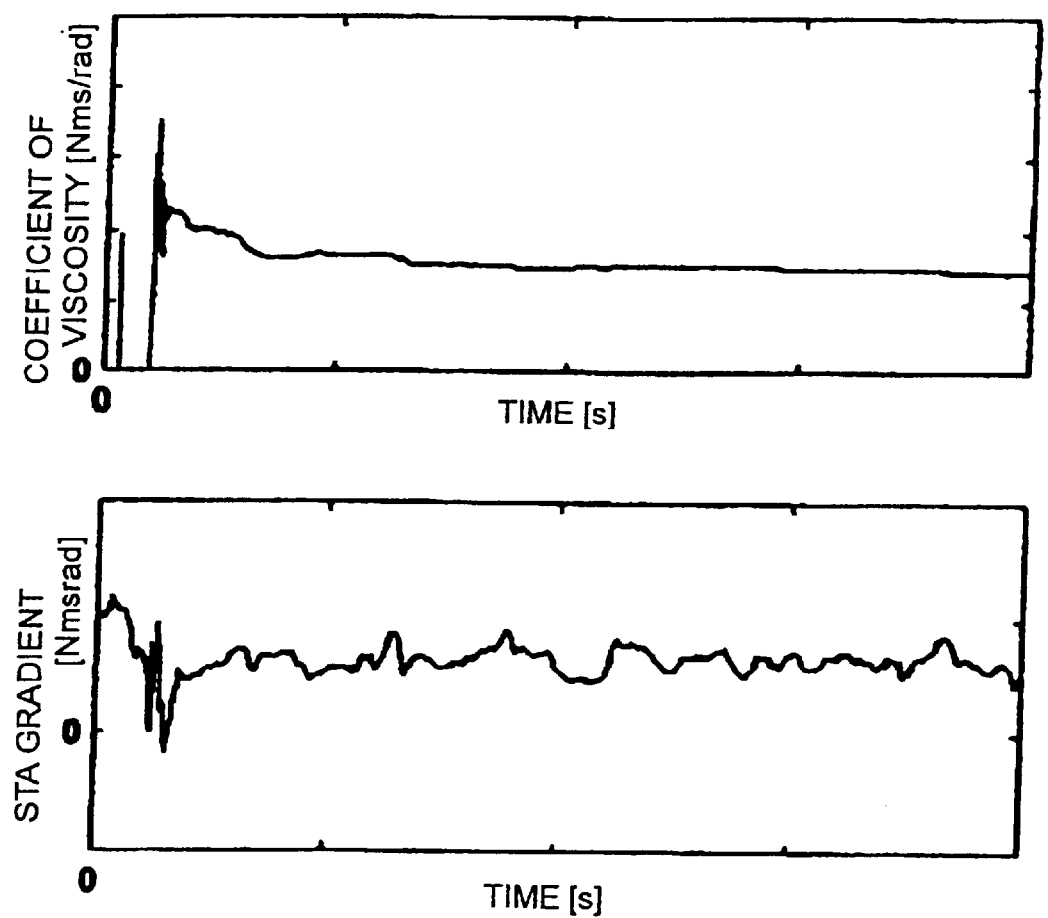
FIG. 4 is a figure showing a result when the embodiment of the present invention is applied, especially a result in the case of a normal temperature.

FIGS. 3 and 4 show estimated results of the coefficient of the viscosity dm and the SAT gradient k in the case where temperature conditions are different. FIG. 3 shows an estimated result in a case of a low temperature, and FIG. 4, in the case of a normal temperature. It is evident that the coefficient of viscosity changes in accordance with a change in temperature, while there is little change in the SAT gradient in accordance with a change in temperature.

What is claimed is:

1. An internal drag calculation apparatus for a steering unit of a vehicle, which calculates an internal drag generated in the steering unit by a steering operation in the steering unit, the internal drag calculation apparatus comprising:

means for calculating an action force acting on the steering unit, means for calculating a steering force acting on the steering unit for steering, means for calculating an external force obtained by deducting the steering force from the action force, and internal drag calculation means for obtaining the internal drag by separating the external force into an outside force which is input from outside of the vehicle, and the internal drag.

2. The internal drag calculation apparatus for a steering unit according to claim 1, wherein the internal drag calculation means obtains the internal drag by setting the outside force as a function of a predetermined physical quantity indicating an amount of the steering operation, setting the internal drag as a function of a predetermined physical quantity indicating a speed of the steering operation, and obtaining a function indicating the internal drag from these two functions and the external force.

3. The internal drag calculation apparatus for a steering unit according to claim 2, wherein the means for calculating the action force comprises:
steering characteristics memory means for storing characteristics regarding a motion of the steering unit beforehand,
steering state detection means for detecting a predetermined physical quantity indicating a motion state of the steering unit, and
steering motion analysis means that computes the action force by analyzing the motion of the steering unit based on the predetermined physical quantity indicating the motion state of the steering unit according to the characteristics regarding motion of the steering unit, and, wherein
a means for calculating the outside force comprises:
vehicle characteristics memory means for storing characteristics regarding motion of the vehicle beforehand,
vehicle state detection means for detecting a predetermined physical quantity indicating a motion state of the vehicle, and
vehicle motion analysis means for computing the outside force by analyzing the motion of the vehicle based on the predetermined physical quantity indicating the motion state of the vehicle according to the characteristics regarding motion of the vehicle.

4. The internal drag calculation apparatus for the steering unit according to claim 3, wherein the vehicle has wheels steered by the steering operation,
the steering unit has a rack and pinion mechanism,
the outside force is a self-aligning torque generated in the wheels that are steered,
the predetermined physical quantity indicating an amount of the steering operation is a side slip angle of the wheels that are steered,
the internal drag is a viscous force generated in the steering unit, and
the predetermined physical quantity indicating the speed of the steering operation is a rotational speed of a pinion of the rack and pinion mechanism.

5. The steering unit which has an internal drag calculation apparatus according to any one of claims 1 to 4, comprising:

assistant means for generating an assistant force for a steering force from a driver, assistance control means for controlling the assistant force based on the internal drag.

* * * * *